(12) United States Patent
Incorvia et al.

(10) Patent No.: US 6,178,773 B1
(45) Date of Patent: Jan. 30, 2001

(54) SELF-RETAINING ADSORBENT UNIT

(75) Inventors: Samuel A. Incorvia, North Tonawanda; Peter R. Millen, Corfu, both of NY (US)

(73) Assignee: Multisorb Technologies, Inc., Buffalo, NY (US)

( * ) Notice: Under 35 U.S.C. 154(b), the term of this patent shall be extended for 0 days.

(21) Appl. No.: 09/454,046

(22) Filed: Dec. 3, 1999

(51) Int. Cl.[7] .................................................. F25B 43/00
(52) U.S. Cl. ................................................ 62/512; 62/475
(58) Field of Search ..................................... 62/475, 512

(56) References Cited

U.S. PATENT DOCUMENTS

| | | | |
|---|---|---|---|
| 4,453,955 | * 6/1984 | Cullen et al. | 55/387 |
| 4,457,843 | * 7/1984 | Cullen et al. | 210/282 |
| 4,464,261 | 8/1984 | Cullen et al. | 210/282 |
| 4,619,673 | 10/1986 | Cullen et al. | 55/387 |
| 4,911,739 | 3/1990 | Cullen et al. | 55/387 |
| 4,994,185 | 2/1991 | Cullen et al. | 210/282 |
| 5,036,972 | * 8/1991 | Cullen et al. | 206/204 |
| 5,177,982 | * 1/1993 | Plemens | 62/503 |
| 5,693,124 | * 12/1997 | Dobson et al. | 96/147 |
| 5,814,136 | * 9/1998 | Wood | 96/147 |
| 6,083,305 | 7/2000 | LeConey et al. | 96/147 |

* cited by examiner

*Primary Examiner*—William Doerrler
*Assistant Examiner*—Mel Jones
(74) *Attorney, Agent, or Firm*—Joseph P. Gastel

(57) ABSTRACT

An adsorbent unit including a porous container having first and second end portions, adsorbent in the container, a rigid clip on the first end portion for engaging the spaced pipes of a U-bend of a refrigerant accumulator, a tab on the second end portion, and an aperture in the tab for receiving the filter housing on the return bend of a U-shaped pipe.

16 Claims, 5 Drawing Sheets

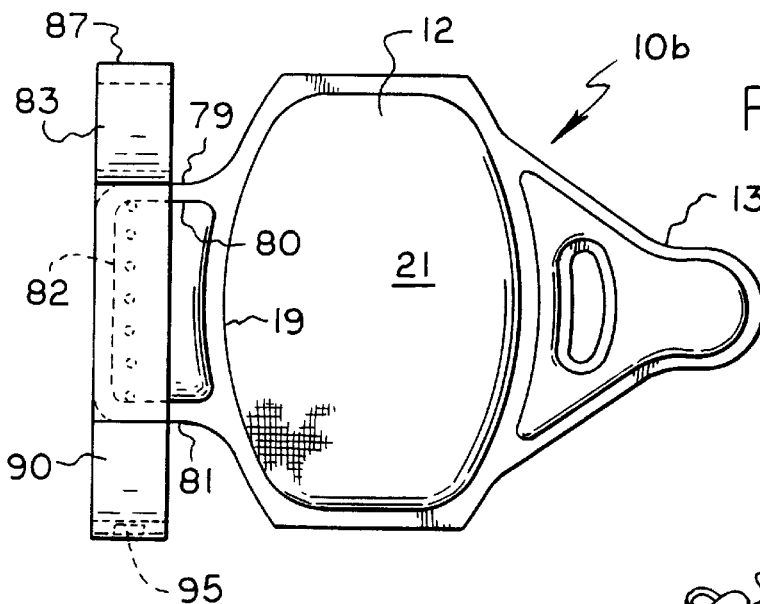
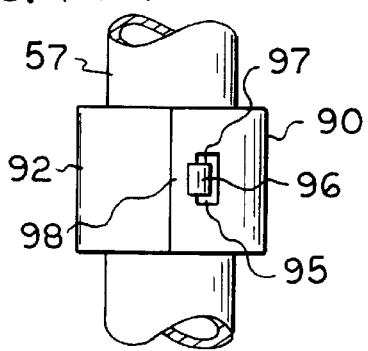
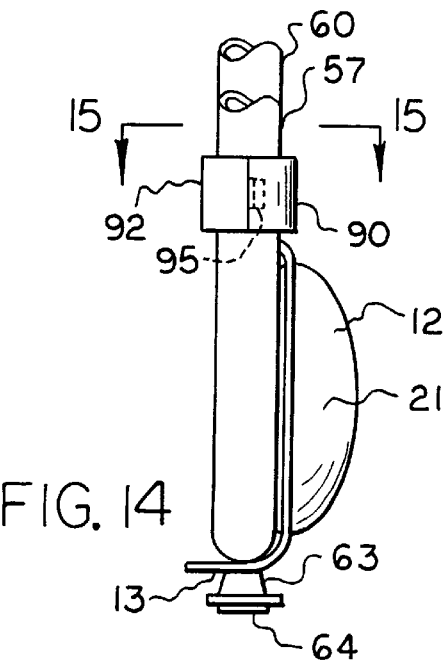
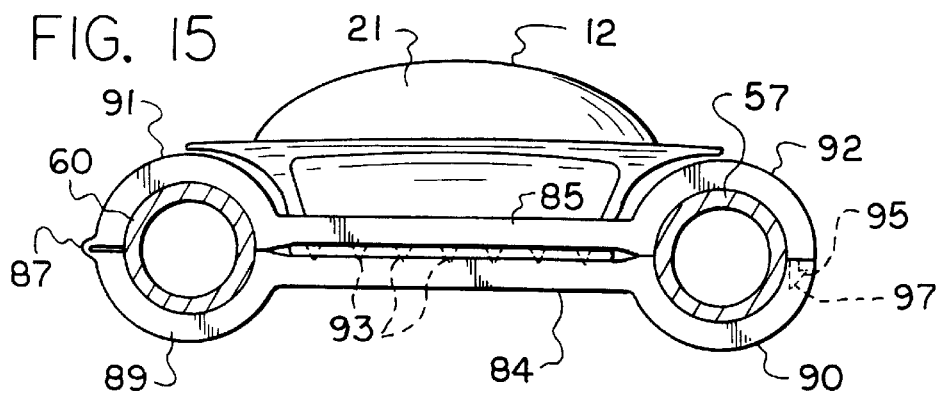

SELF-RETAINING ADSORBENT UNIT

BACKGROUND OF THE INVENTION

The present invention relates to an adsorbent unit for use in a refrigerant accumulator of an air conditioning system which contains a U-shaped return bend pipe.

By way of background, an adsorbent unit is utilized in a refrigerant accumulator for the purpose of adsorbing moisture in the refrigerant. In the past, insofar as known, prior devices did not have a rigid clip at one end thereof and a tab at the other end for mounting on the filter housing at the bottom of a U-bend.

BRIEF SUMMARY OF THE INVENTION

It is one object of the present invention to provide an improved single container adsorbent unit for a U-bend pipe of a refrigerant accumulator in which the mounting structure includes a rigid clip at one end thereof for positively engaging the spaced pipes of a U-bend and an apertured tab at the other end thereof for mounting on the filter housing at the bottom of a U-bend.

The present invention relates to an adsorbent unit comprising a porous container having first and second end portions, adsorbent in said container, a rigid clip on said first end portion, a tab on said second end portion, and an aperture in said tab.

The present invention also relates to a refrigerant accumulator having a housing with a bottom wall and a side wall and a U-shaped pipe with a return bend adjacent said bottom wall and with first and second pipes extending from said return bend within said housing, and a filter body extending outwardly from said return bend, the improvement of an adsorbent unit comprising a porous adsorbent container, adsorbent in said container, first and second end portions on said container, a tab extending outwardly from said first end portion of said container, means on said tab for attachment to said filter, and rigid clip means on said second end portion for attachment to said first and second pipes.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 13 is a plan view of the clip of FIGS. 11 and 12 mounted in position on the adsorbent container of FIGS. 9 and 10;

FIG. 14 is a side elevational view of the adsorbent unit of FIG. 13 mounted on a U-bend pipe;

FIG. 14A is a fragmentary enlarged view of a portion of FIG. 14; and

FIG. 15 is an enlarged cross sectional view taken substantially along line 15—15 of FIG. 14.

DETAILED DESCRIPTION OF THE INVENTION

Figure 1:
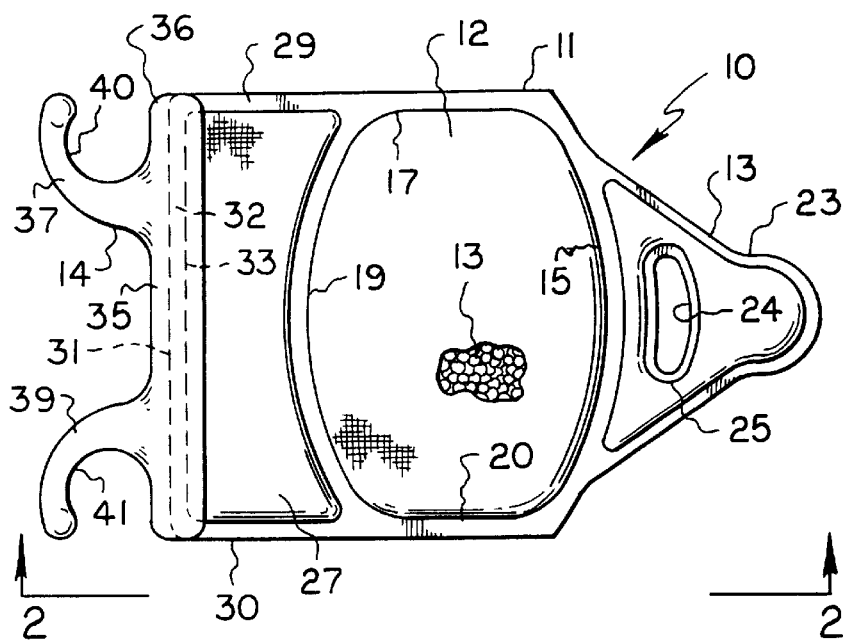
FIG. 1 is a partially broken away plan view of one embodiment of the adsorbent unit of the present invention showing the pronounced convex surface portion thereof.
Figure 2:
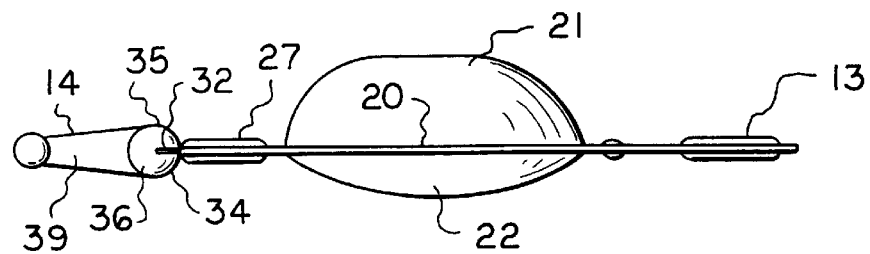
FIG. 2 is a side elevational view taken substantially in the direction of arrows 2—2 of FIG. 1.

The adsorbent unit 10 of the present invention includes a casing 11 formed of porous material, in this instance, heat-fusible felted polyester, but it may be fabricated of any other suitable material. Casing 11 is formed from two sides of felted polyester which are bonded to each other by fused seams, and it comprises a container 12 containing adsorbent 13 with the container having an apertured tab 13 extending outwardly from one end thereof and a rigid clip 14 on the opposite end thereof. Container 12 is defined by fused seams 15, 17, 19 and 20, and it has a pronounced convex surface 21 and a less convex surface 22. Tab 13 includes an outer fused seam 23 which merges into fused seam 15. Tab 13 also includes an aperture in the form of an elongated slot 24 which is defined by fused seam 25.

The opposite end of container 12 includes a fabric portion 27 consisting of two plies of felted polyester, and it is outlined in part by fused seam 19, fused seam 29, which is an extension of fused seam 17, fused seam 30, which is an extension of fused seam 20, and fused seam 31, which extends between fused seams 29 and 30. Rigid clip 14 is bonded to the outer edge of tab 27 by heat and pressure. More specifically, rigid clip 14 is fabricated of a suitable rigid polyester material, and it has a central portion 36 with a slot 32 which extends throughout the length thereof and which receives fused seam 31 and an adjacent portion 33 of tab 27. The two sides 34 and 35 of central portion 36 are pressed together under heat and pressure with the outer end of tab 27 therebetween to bond clip 14 to tab 27. Clip 14 includes two outwardly facing arms 37 and 39 having concave inner sides 40 and 41, respectively.

Figure 3:
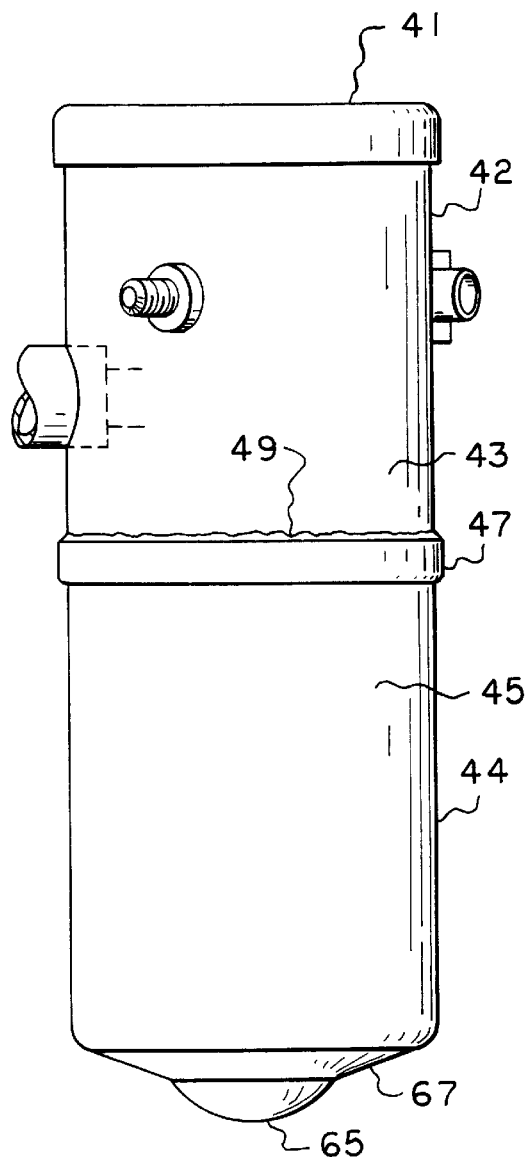
FIG. 3 is a side elevational view of an accumulator type of receiver in which the adsorbent unit of FIGS. 1 and 2 is mounted.

The adsorbent unit 10 is intended to be mounted in a prior art type of accumulator type of receiver 41 (FIGS. 3 and 4) which includes an upper cylindrical housing portion 42 having a side wall 43 and having a lower cylindrical housing portion 44 having a side wall 45 and having a flange 47 which receives the lower edge portion of upper portion 42 with an interference fit, and a joint is thereafter hermetically welded at 49. Insofar as pertinent here, the accumulator 41 includes a U-bend pipe 50 and a refrigerant inlet pipe 51 which receives a mix of gaseous and liquid refrigerant and conducts it through pipe 52 having an open end 53 proximate concave surface 54 such that the refrigerant impinges thereon and enters the accumulator. The upper end 55 of U-shaped pipe 50 is open, and it receives gaseous refrigerant which passes through pipe 57, return bend 59, pipe 60 and pipe 61 to outlet 62 which leads to the compressor, as is well known in the art. As noted above, the gaseous refrigerant passes through U-shaped tube 50 because it rises to the top while the liquid refrigerant from the evaporator drops to the bottom of the accumulator. A lubricant inlet (not shown) is located at the underside of the return bend 59. A filter housing 63 having a filter 64 thereon is in communication with the lubricant inlet in the return bend 59 such that lubricant which accumulates in depression 65 of bottom wall 67 is induced into the return bend and conveyed with the gaseous refrigerant to the compressor, as is well known in the art. As can be seen from FIG. 4, the U-bend 50 includes two spaced pipes 57 and 60 which are connected by U-bend 59. In the present instance, pipe 60 is substantially vertical and pipe 57 is inclined. A U-bend 40 is sometimes referred to as a J-bend.

Figure 5:
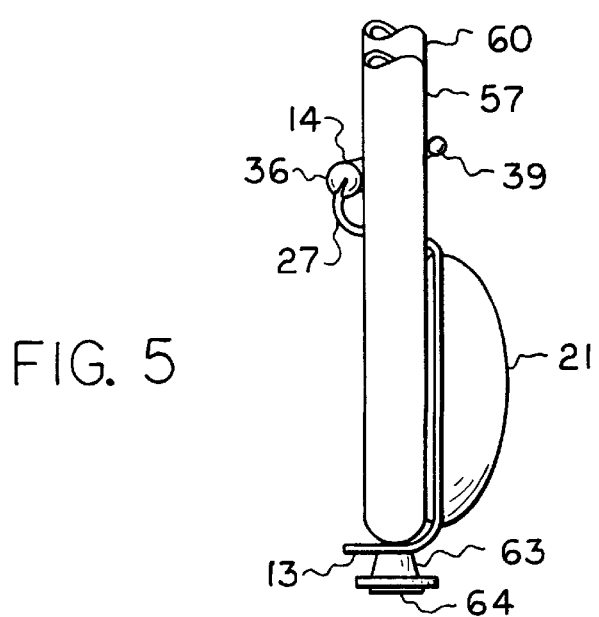
FIG. 5 is a fragmentary side elevational view taken substantially in the direction of arrows 5—5 of FIG. 4.
Figure 4:
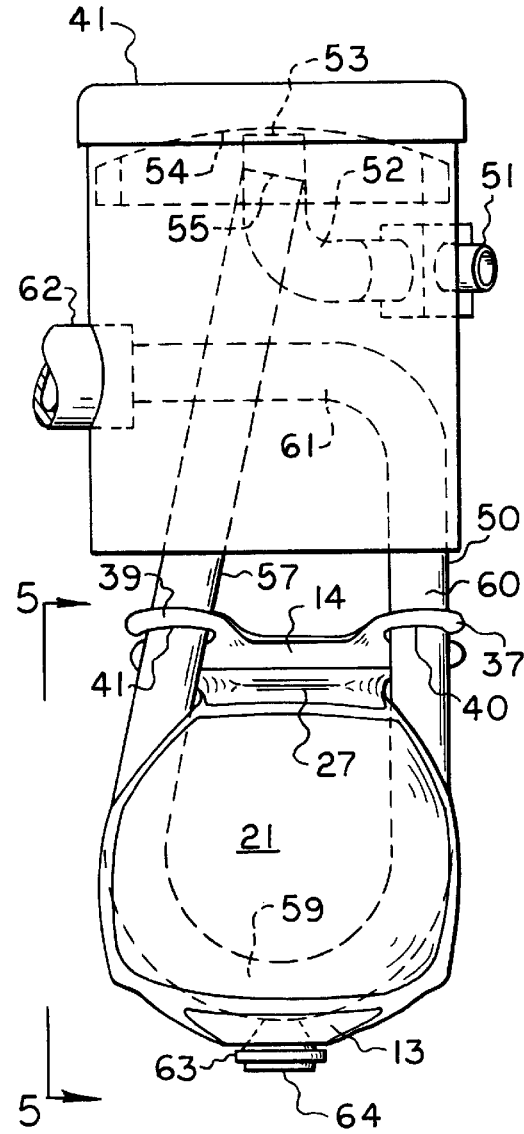
FIG. 4 is a side elevational view of the accumulator of FIG. 3 with the bottom portion removed and the adsorbent unit of the present invention mounted relative to the U-bend pipe therein.

In FIGS. 4 and 5 the adsorbent unit 10 is shown in its installed position. In this respect, clip 14 has its concave portion 41 receiving pipe 60 and its concave portion 40 receiving pipe 57 and filter housing 63 is received in elongated slot 24. It is to be noted from FIGS. 4 and 5 that fabric portion 27 preferably passes between pipes 57 and 60, and this tends to retain the adsorbent container in the position shown in FIG. 5.

Figure 6:
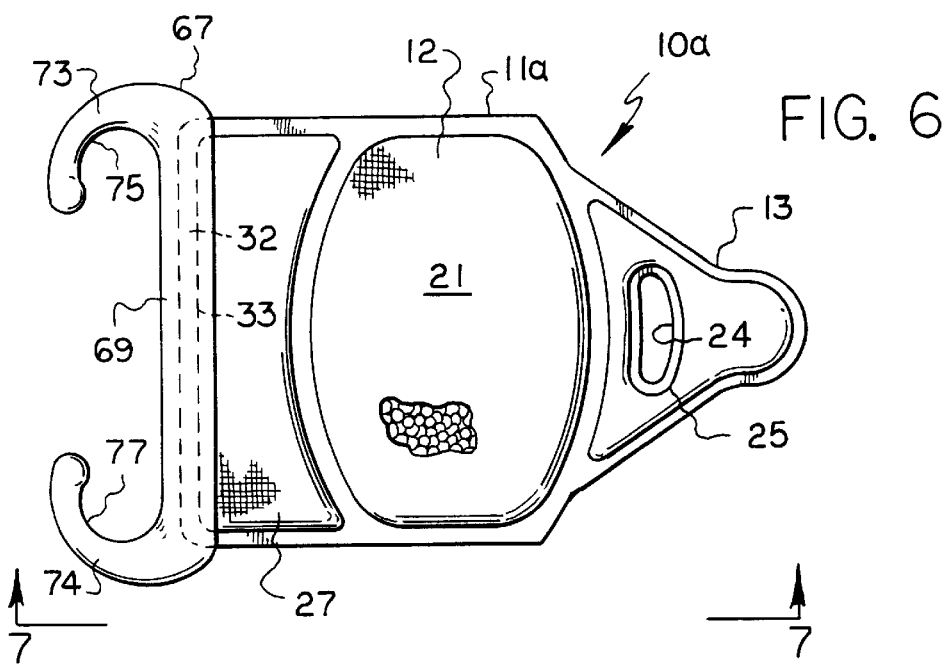
FIG. 6 is a partially broken away plan view of another embodiment of the adsorbent unit of the present invention.
Figure 7:
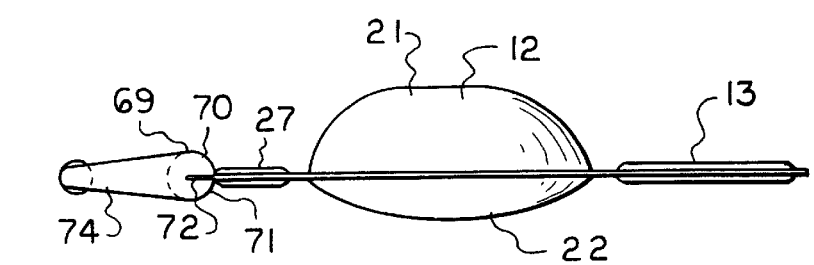
FIG. 7 is a side elevational view taken substantially in the direction of arrows 7—7 of FIG. 6.
Figure 8:
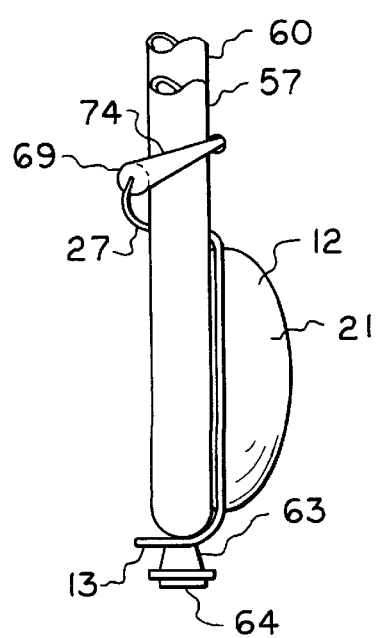
FIG. 8 is a fragmentary side elevational view similar to FIG. 5 but showing the embodiment of FIG. 6 mounted relative to a U-bend pipe.
Figure 9:
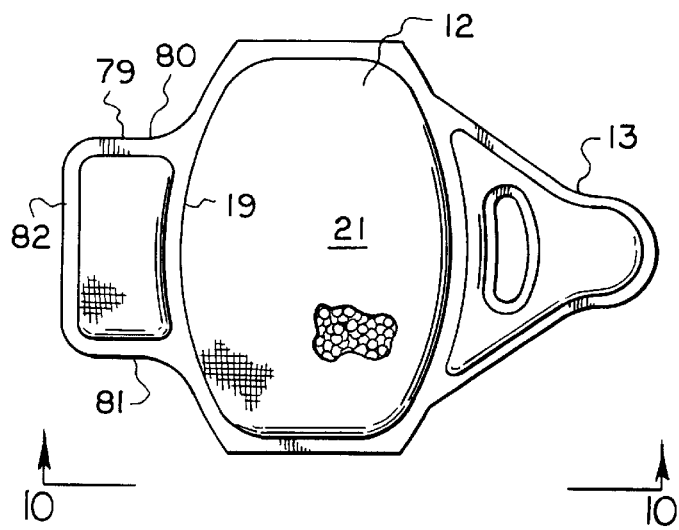
FIG. 9 is a plan view of yet another embodiment of an adsorbent unit of the present invention.
Figure 10:
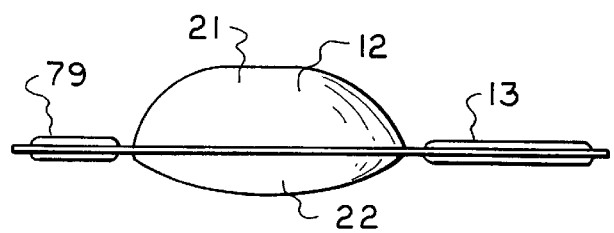
FIG. 10 is a side elevational view taken substantially in the direction of arrows 10—10 of FIG. 9.
Figure 11:
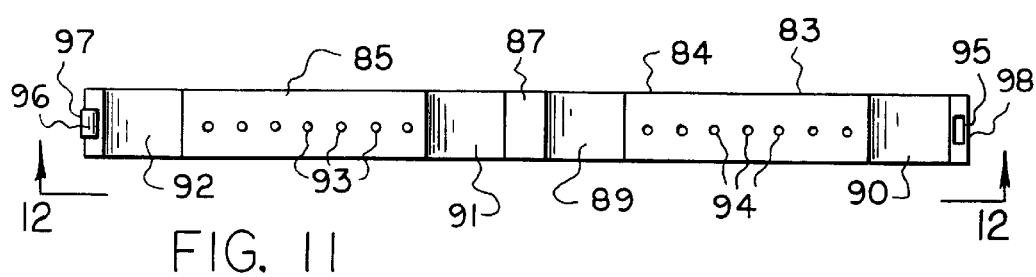
FIG. 11 is a plan view of the clip structure in an unfolded condition which is to be mounted on the embodiment of FIGS. 9 and 10.
Figure 12:
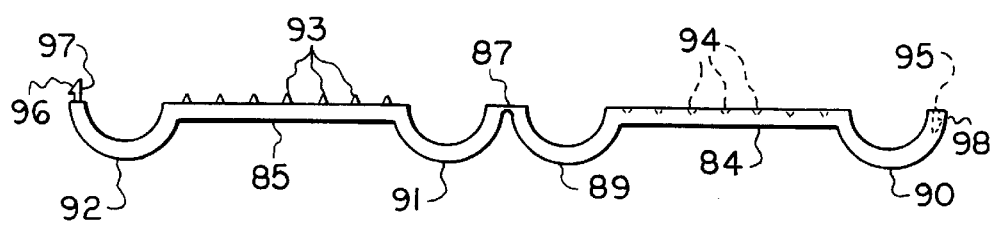
FIG. 12 is a side elevational view taken substantially in the direction of arrows 12—12 of FIG. 11.

In FIGS. 6 and 7 a modified embodiment of the adsorbent unit 10 of FIG. 1 is shown. Adsorbent unit 10a includes a casing 11a which is identical in all respects to the casing 11 of FIG. 1. In this respect, it includes a tab 13 which is identical in all respects to tab 13 of FIG. 1 and a tab 27 which is identical in all respects to tab 27 of FIG. 1 and a container 12 which is identical in all respects to the container 12 of FIG. 1. Therefore, a further description of all of these parts is not necessary because reference can be made to FIG. 1. The only difference between adsorbent unit 10a of FIG. 6 and adsorbent unit 10 of FIG. 1 resides in the clip 67 which is fabricated of rigid solid polyester material, and it includes a central portion 69 having portions 70 and 71 on opposite sides of a central slit 72 which extends throughout the length of central portion 69. Slit 72 receives fused seam 32 and adjacent portion 33 of tab 27. As in the embodiment of FIG. 1, heat and pressure are applied to opposite sides of central portion 69 to fuse clip 67 onto the end of tab 27. Clip 67 differs from clip 36 of FIG. 1 in that arms 73 and 74 include concave inner sides 75 and 77, respectively, which face toward each other whereas the concave inner sides 40 and 41 of FIG. 1 face away from each other.

The embodiment of FIGS. 6 and 7 is shown in mounted position on pipes 57 and 60 wherein arm 74 receives pipe 57 and arm 73 receives pipe 60 and wherein filter housing 63 is received within elongated slot 24 of tab 13. As in FIG. 5, the adsorbent unit 10 is preferably mounted so that tab 27 passes between pipes 57 and 60, as described above relative to FIG. 5.

In FIGS. 9–15 a further clip-on adsorbent unit 10b is shown (FIG. 13) which includes an adsorbent container 12 which may be identical in all respects to adsorbent container 12 of FIG. 1 and a tab 13 which may be identical in all respects to tab 13 of FIG. 1. However, tab 79 of adsorbent unit 10b differs from the tab 27 of FIG. 1. In this respect, tab 79 includes fused seams 80 and 81 which merge into fused seam 19 of container 12, and fused seam 82 joins fused seams 80 and 81 to define tab 79 which consists of two sheets of polyester fabric which are continuations of the sides of container 12.

A clip 83 is secured to tab 79. Clip 83 is fabricated from rigid plastic material, preferably polyester, and it has two sides 84 and 85 which are connected by a living hinge 87. Side 84 has semicircular clamping members 89 and 90 on opposite ends thereof, and side 85 includes semicircular clamping members 91 and 92 on opposite ends thereof. Side 85 includes a plurality of pointed protuberances 93 and side 84 includes a plurality of recesses 94. A barbed latch 97 having a barbed tip 96 extends outwardly from the end of side 85, and an aperture 95 is located at the outer end of side 84.

Clip 83 is shown in installed position on tab 79 in FIGS. 13, 14, 14A and 15. In this respect, sides 84 and 85 are folded together about living hinge 87 so that pointed protuberances 93 will pass through tab 79 and into depressions 94, and barbed latch 97 having a barbed tip 96 at the end of semicircular portion 92 will enter aperture 95 in semicircular portion 90, and semicircular portions 90 and 92 will clamp onto pipe 57, and semicircular portions 89 and 91 will clamp onto pipe 60, as shown in FIGS. 14 and 15. Since protuberance 97 is formed in the shape of a barb, and bore 97 is preferably formed so that there is a band 98 (FIG. 14A) at its end, once barbed latch 97 enters aperture 95, it will be positively retained therein because the barb at the end of latch 97 will be held by band 98.

While the preferred attachment structure for the filter housing is the aperture in the tab, it will be appreciated that other means of attachment may be utilized including, but not limited to, a hook structure formed at the end of the adsorbent container or a tie extending from the end of the adsorbent container.

In the above description bonding was described as being effected by heat and pressure but it will be understood that the bonding can be effected by ultrasonic welding or any other suitable type of bonding. Also, while the clips have been referred to as being fabricated of polyester, it will be appreciated that they can be fabricated of polypropylene or any other material which can be used in a refrigerant environment.

While preferred embodiments of the present invention have been disclosed, it will be appreciated that it is not limited thereto but may be otherwise embodied within the scope of the following claims.

What is claimed is:

1. An adsorbent unit comprising a porous container having first and second end portions, adsorbent in said container, a rigid clip bonded to said first end portion, a tab on said second end portion, and an aperture in said tab.

2. An adsorbent unit comprising a porous container having first and second end portions, adsorbent in said container, a rigid clip on said first end portion, a tab on said second end portion, and an aperture in said tab, said clip including two arms having outwardly facing concave inner sides.

3. An adsorbent unit as set forth in claim 1 wherein said clip includes two arms having inwardly facing concave inner sides.

4. An adsorbent unit comprising a porous container having first and second end portions, adsorbent in said container, a rigid clip on said first end portion, a tab on said second end portion, and an aperture in said tab, said clip including clamping members at its outer ends.

5. An adsorbent unit comprising a porous container having first and second end portions, adsorbent in said container, a rigid clip on said first end portion, a tab on said second end portion, an aperture in said tab, said clip including two facing sections, and clamping members at the outer ends of said two facing sections.

6. An adsorbent unit as set forth in claim 5 wherein said two facing sections are connected by a living hinge at one of said outer ends.

7. An adsorbent unit as set forth in claim 6 wherein said clamping members are substantially in the shape of cylinders.

8. An adsorbent unit comprising a casing, first and second end portions on said casing, adsorbent in said casing, first means on said first end portion for attachment to the return bend of a U-shaped pipe, and rigid clip means on said second end portion for attachment to spaced pipes of a U-shaped pipe.

9. In a refrigerant accumulator having a housing with a bottom wall and a side wall and a U-shaped pipe with a return bend adjacent said bottom wall and with first and second pipes extending from said return bend within said housing, and a filter body extending outwardly from said return bend, the improvement of an adsorbent unit comprising a porous adsorbent container, adsorbent in said container, first and second end portions on said container, a tab extending outwardly from said first end portion of said container, means on said tab for attachment to said filter, and rigid clip means on said second end portion for attachment to said first and second pipes.

10. In a refrigerant accumulator as set forth in claim 9 wherein said rigid clip means includes two arms having outwardly facing concave inner sides.

11. In a refrigerant accumulator as set forth in claim 9 wherein said rigid clip means includes two arms having inwardly facing concave inner sides.

12. In a refrigerant accumulator as set forth in claim 9 wherein said rigid clip means includes clamping members at its outer ends.

13. In a refrigerant accumulator as set forth in claim 9 wherein said rigid clip means includes two facing sections, and clamping members at the outer ends of said two facing sections.

14. In a refrigerant accumulator as set forth in claim 13 wherein said two facing sections are connected by a living hinge at one of said outer ends.

15. In a refrigerant accumulator as set forth in claim 14 wherein said clamping members are substantially in the shape of cylinders.

16. In a refrigerant accumulator having a housing with a bottom wall and a side wall and a U-shaped pipe with a return bend adjacent said bottom wall and with first and second pipes extending from said return bend within said housing, and a filter body extending outwardly from said return bend, the improvement of an adsorbent unit comprising a porous adsorbent container, adsorbent in said container, first and second end portions on said container, a tab extending outwardly from said first end portion of said container, an aperture in said tab receiving said filter, and a rigid clip on said second end portion attached to said first and second pipes.

\* \* \* \* \*